A. S. CHRISTENSEN.
DRIVING GEAR FOR MECHANICALLY PROPELLED VEHICLES.
APPLICATION FILED JULY 18, 1913.
1,129,643.
Patented Feb. 23, 1915.
2 SHEETS—SHEET 1.
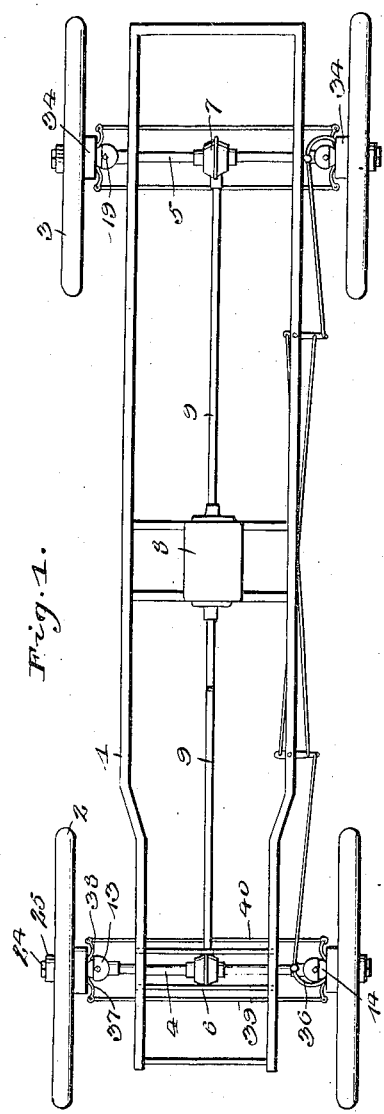
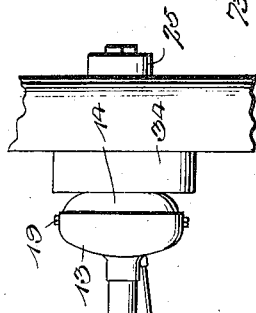
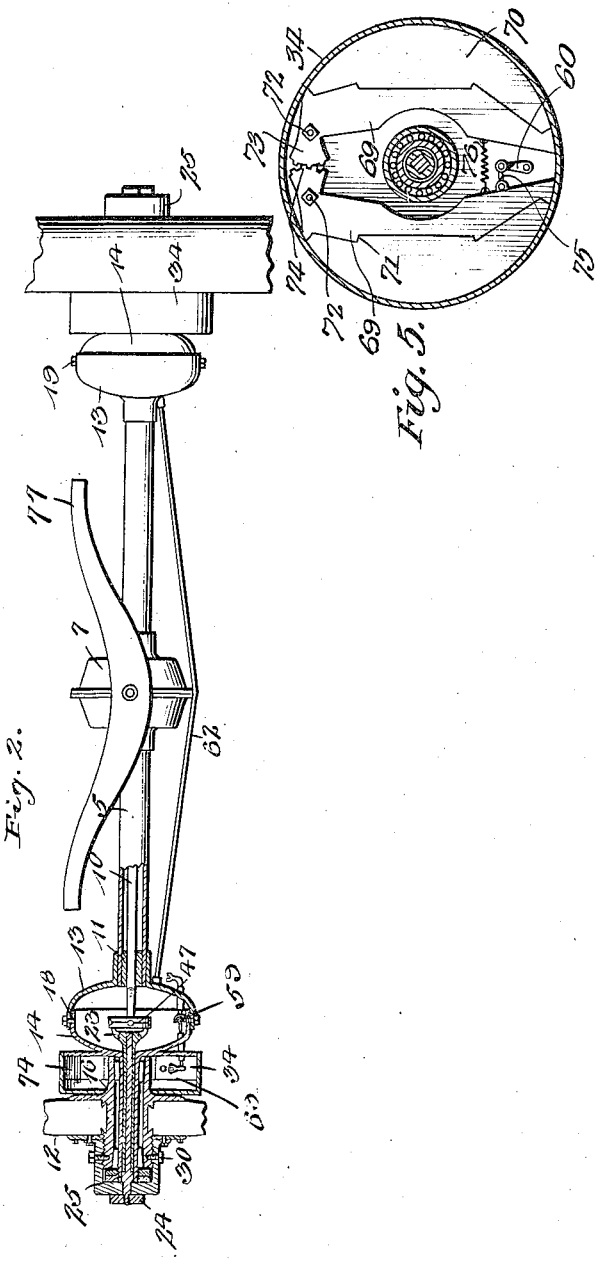
Inventor
A. S. Christensen,
Witnesses
By Victor J. Evans
Attorney

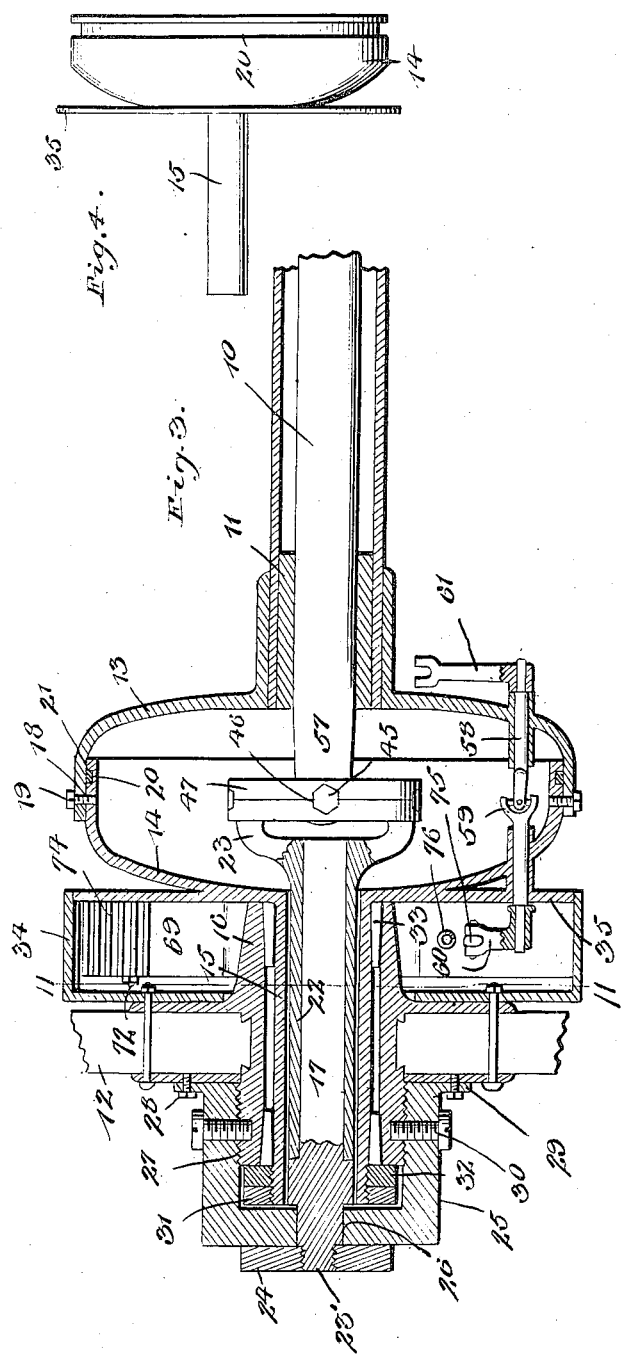

UNITED STATES PATENT OFFICE.

AUGUST S. CHRISTENSEN, OF KENMARE, NORTH DAKOTA.

DRIVING-GEAR FOR MECHANICALLY-PROPELLED VEHICLES.

1,129,643.  Specification of Letters Patent.  Patented Feb. 23, 1915.

Application filed July 18, 1913. Serial No. 779,825.

*To all whom it may concern:*

Be it known that I, AUGUST S. CHRISTENSEN, a citizen of the United States, residing at Kenmare, in the county of Ward and State of North Dakota, have invented new and useful Improvements in Driving-Gears for Mechanically-Propelled Vehicles, of which the following is a specification.

This invention relates to driving gear for mechanically propelled vehicles the object of the invention being to provide mechanism for simultaneously driving two of the wheels or all four of the wheels of a motor driven vehicle, at the same time allowing for the use of the usual differential gear, and also admitting of the free turning movement of all of the wheels involved for steering purposes, the rear wheels being turned reversely to the front wheels and therefore requiring one half the amount of angularity of each set of wheels as compared with steering mechanism by means of which the front wheels alone are turned.

A further object of the invention is to provide a novel construction of combined housing and knuckle joint whereby the wheels are permitted to be turned to the necessary angle to steer the machine and at the same time a universal joint which connects the axle with the wheel spindle is covered in and protected against the admission of foreign matter thereby keeping all parts of the universal joint and wheel bearing in working condition.

With the above and other objects in view the invention consists in the novel construction, combination and arrangement of parts herein fully described, illustrated and claimed.

In the accompanying drawings: Figure 1 is a plan view of the chassis of an automobile showing the present invention applied thereto. Fig. 2 is a vertical longitudinal section through one of the axle housings and wheel hubs, showing the driving axle and the connections between said axles and the wheels, on an enlarged scale. Fig. 3 is an enlarged detail vertical section through one of the wheels, showing also a portion of the axle, axle housing, and connections between the axle and wheel. Fig. 4 is a detail elevation of one of the universal joint housing sections showing the packing rings. Fig. 5 is a vertical section on the line 11—11 of Fig. 3.

Referring primarily to Fig. 1, 1 designates the usual frame of an automobile running gear or chassis, 2 the front wheels, 3 the rear wheels, 4 and 5 the front and rear axle housings, 6 and 7 the front and rear differential gears, 8 a centrally located transmission gear and 9 the drive shafts extending from the centrally located transmission gear 8 into the differential gear housings 6 and 7, whereby motion is transmitted from a central point to both the front and rear axles for the purpose of simultaneously driving all four wheels of the machine.

Referring now to Fig. 3, 10 designates one of the driving axles of the machine, it being understood that each axle is made in two parts connected by the centrally located differential gear in such manner as to enable each end section or portion of the axle to have a driving rotation independently of its mate thus allowing for the turning of the machine. The axle 10 shown in Fig. 3 is mounted in one of the axle housings, for example the housing 5 shown in Fig. 1, the end portion of the housing 5 containing a bushing 11 in which the axle 10 turns.

In carrying out the present invention, a universal joint housing is arranged between the end of the axle housing 5 and the adjacent wheel indicated at 12, said housing embodying an inner member 13 fast on the end of the housing 5 and an outer member 14 which carries a tubular journal 15 projecting outwardly therefrom and having the hub 16 of the wheel mounted to turn thereon. The housing sections 13 and 14 are hollow and form a substantially spherical or oval shaped casing in which the universal joint connecting the axle 10 and the wheel spindle 17 is mounted and protected. At their adjoining edges and peripheries the sections 13 and 14 are overlapped as indicated at 18 and they are pivotally connected at the top and bottom of the housing by means of pivot bolts 19, the said pivot bolts being located in line with the axis of movement of the universal joint contained in the housing and hereinafter particularly described, thus enabling the wheel to be turned at an angle relatively to the axle 10 without interrupting or interfering with the operation of the driving gear. The housing sections 13 and 14 thus form one of the steering knuckles of the machine. One of the sections, for example the section 14 of the housing, is formed with a groove 20 in the overlapping edge thereof and a packing ring 21 is situated in said groove, the other housing section 13 working over and in contact with said packing ring so as to effect a liquid tight joint between the two sections which will exclude foreign matter and retain oil or grease therein. The central portion or core 17 of the spindle is square in cross section and passes through a sleeve 22 which turns therewith and forms a portion of the spindle, said spindle as a whole being provided at its inner end with a fork 23 for connection with the hub of the universal joint hereinafter described. The core member 17 of the spindle is shown as extended beyond the sleeve 22, the extremity thereof being reduced and threaded as shown at 23' to receive a reducing nut 24, the threads at 23' and within the nut 24 being right handed at the right hand side of the machine and left handed at the opposite side of the machine so that the nuts 24 will tend to tighten in the forward movement of the machine.

In order to transmit motion from the spindle to the wheel, a cylindrical cap 25 provided in its outer end with a square hole 26 to receive the squared end of the spindle 17 is slipped over the end of the spindle and is threaded as shown at 27 on the hub 16 of the wheel and when screwed tightly to place, said cap is fastened to the wheel by means of screws or bolts 28 inserted through a flange 29 at the inner end of the cap 25. In addition to the screws or bolts 28, set screws 30 may be inserted through the cap 25 and against the hub 16 as shown in Fig. 3. The hub 16 is held on the tubular journal 15 by means of a nut 31 and a lock nut 32. If desired bearing rollers 33 may be interposed between the hub 16 and the tubular journal 15 to reduce friction to a minimum.

Secured to the inner face of the wheel 12 is a cylindrical brake drum 34 the inner side of which is open but closed in its applied position by means of a cover 35 in the form of a flange formed integrally with and carried by the section 14 of the universal joint housing hereinabove described. It will now be understood at this point that the parts 14, 35 and 15 are formed as an integral whole the part 15 constituting the tubular journal on which the wheel is mounted to revolve. Therefore when a pivotal action occurs between the sections 14 and 13, the wheel and its spindle are swung in a corresponding direction, the steering of the wheel being effected by a steering arm 36 to which the usual steering rod of the machine is attached, and the wheels at opposite ends of the same axle being caused to turn equally by providing the outer section 14 of the housing with forwardly extending equalizing arms 37 and rearwardly extending equalizing arms 38, the arms 37 being connected by rod 39, and the arms 38 being connected by a rod 40 as shown in Fig. 1.

The brake drum 34 is designed to receive an internal expanding brake (not shown) the brake being operated by a brake shaft 58 which, as shown in Fig. 3, is made in two sections, the sections being pivotally coupled together as shown at 59 by a tumbling joint 59 which is located in line with the axis of the universal joint and also the pivots 19 and 20 of the combined housing and steering knuckle, whereby the two sections of the brake shaft 58 are adapted to turn when the steering wheel is turned. The shaft 58 is provided at one end with an arm 60 to which the expanding brake connections are attached and by which the brake is actuated, while at the other end the said shaft 59 is provided with an operating arm 61 to which the usual manually controlled connections are attached.

62 designates a truss rod for bracing the axle housing 5.

By means of the mechanism above described it will now be seen that all four of the wheels of the machine may be driven from the motor while at the same time allowing for the use of the differential gears to compensate for the difference in the speed of rotation of the outer and inner wheels when the machine is following a curved path, also permitting the wheels to be turned in the angular relation to their axles for the purpose of steering the machine. These different movements are permitted in the arrangement described without interfering with the driving mechanism.

The brake mechanism illustrated in Fig. 5 comprises a pair of brake shoe carriers 69 having the brake shoes 70 secured to the outer faces thereof and preferably shouldered as shown at 71 to prevent any relative movement between the brake shoes and the carriers. The carriers are pivotally mounted at 72 within the brake drum 34 and on the disk-shaped drum cover 35 and are provided with segmental extensions 73 which are provided with teeth 74 whereby the brake shoe carriers are adapted to move simultaneously in opposite directions. The arm 60 of the brake shaft above described is connected to the free end of one of the brake shoe carriers by means of a link 75 and serves to operate one of said carriers which through the medium of the toothed segments 73 effects a simultaneous movement of the oppositely located carriers 69. The brake shoe carriers are connected by means of a contractile spring 76 which normally holds the brake shoes out of frictional contact with the drum 34 and serves to retract the brake shoes after they have been thrown outwardly against the drum by the action of the brake shaft.

77 designates one of the body supporting bolsters which may be secured to the axle in any convenient manner.

What is claimed is:

1. In driving gear for mechanically propelled vehicles, the combination of an axle housing, a driving axle, a wheel, a wheel driving spindle, a universal joint connecting said axle and spindle, a combined steering knuckle and housing for said universal joint embodying two hollow semi-oval sections having their adjoining edges overlapped and pivotally connected in line with the axis of said universal joint, a tubular journal formed on one of the said housing sections on which the wheel is supported and through which the driving spindle extends, a brake drum carried by the wheel, and a disk-shaped cover for the open side of the said drum carried by and constituting a part of the adjacent housing section.

2. In driving gear for mechanically propelled vehicles, the combination of an axle housing, a driving axle, a wheel, a wheel driving spindle, a universal joint connecting said axle and spindle, a combined steering knuckle and housing for said universal joint embodying two hollow semi-oval sections having their adjoining edges overlapped and pivotally connected in line with the axis of said universal joint, a tubular journal formed on one of the said housing sections on which the wheel is supported and through which the driving spindle extends, a brake drum carried by the wheel, a disk-shaped cover for the open side of the said drum carried by and forming a part of the adjacent housing section, brake shoes pivotally supported by said cover and a brake shaft journaled in said housing sections and embodying two sections connected by a tumbling joint in line with the pivotal connection between said housing sections.

In testimony whereof I affix my signature in presence of two witnesses.

AUGUST S. CHRISTENSEN.

Witnesses:
F. W. FRIIS,
J. W. INGISON.